United States Patent [19]
Pitzi

[11] Patent Number: 5,361,740
[45] Date of Patent: Nov. 8, 1994

[54] MECHANICAL ASSEMBLIES WITH HARDENED BEARING SURFACES

[75] Inventor: Vincent J. Pitzi, South Windsor, Conn.

[73] Assignee: Jacobs Brake Technology Corporation, Wilmington, Del.

[21] Appl. No.: 38,217

[22] Filed: Mar. 29, 1993

[51] Int. Cl.$^5$ .............................................. F02D 13/04
[52] U.S. Cl. .................................. 123/321; 123/193.6
[58] Field of Search ....................... 123/321, 322, 90.13, 123/193.6, 90.12; 92/212, 222; 29/888.042, 888.044, 888.047

[56] References Cited

U.S. PATENT DOCUMENTS

| | | | |
|---|---|---|---|
| 4,245,611 | 1/1981 | Mitchell et al. | 123/193.6 |
| 4,649,806 | 3/1987 | Hartsock | 123/193.6 |
| 4,706,625 | 11/1987 | Meistrick | 123/321 |
| 4,838,149 | 6/1989 | Donnison et al. | 123/193.6 |
| 4,898,128 | 2/1990 | Meneely | 123/321 |
| 5,165,375 | 11/1992 | Hu | 123/321 |
| 5,183,018 | 2/1993 | Vittorio et al. | 123/321 |
| 5,201,290 | 4/1993 | Hu | 123/321 |

OTHER PUBLICATIONS

J. T. Carroll et al., "Compression Brake Master Piston Assembly: A Cost Effective Use of a Structural Ceramic to Reduce Sliding Wear in Heavy Duty Diesel Engines", SAE International, International Congress and Exposition, Detroit, Mich., Mar. 1–5, 1993.

Primary Examiner—Tony M. Argenbright
Assistant Examiner—M. Macy
Attorney, Agent, or Firm—Robert R. Jackson

[57] ABSTRACT

A mechanical component has a recess for receiving a ceramic insert. The insert is held in the recess by a retainer member which preferably resiliently biases the insert inwardly into the recess. The insert provides a hardened bearing surface for the associated mechanical component. For example, the mechanical component may be a piston for use in an engine brake (especially as a master piston in the engine brake), and the ceramic insert may be the portion of the piston assembly which contacts a moving part of the internal combustion engine with which the engine brake is used.

24 Claims, 3 Drawing Sheets

MECHANICAL ASSEMBLIES WITH HARDENED BEARING SURFACES

BACKGROUND OF THE INVENTION

This invention relates to mechanical assemblies of initially separate parts, and more particularly to mechanical assemblies which include hardened bearing surface elements secured to other members. For example, the invention may be applied to attaching a hardened bearing element to a piston (especially a master piston) in a compression release engine brake or to a cam follower in an internal combustion engine.

Although those skilled in the art will appreciate that the invention has many other applications, the invention will be fully understood from the following discussion which is chiefly in the context of applying hardened bearing surfaces to the master pistons in compression release engine brakes.

Meistrick et al. U.S. Pat. No. 4,706,625 (which is hereby incorporated by reference herein) shows a typical prior art engine brake. As shown in FIG. 1 of that patent, the typical engine brake includes hydraulic circuits, each of which (when the engine brake is on) transfers the motion of one part of the associated internal combustion engine (e.g., fuel injector rocker arm 72) to another part of the engine (e.g., sliding pin 51) to open an exhaust valve 60 in a cylinder which is at or near the end of its compression stroke. This releases the gas compressed by the piston in that cylinder and prevents the energy of compression from being recovered during the subsequent expansion stroke of the cylinder. Dissipation of energy in this way helps to slow down, retard, or brake the engine and the associated vehicle.

As shown in FIG. 1 of the '625 patent, each hydraulic circuit in an engine brake typically includes a master piston 66 and a slave piston 50. In the particular engine brake shown in '625 patent FIG. 1, adjusting screw 70 on rocker arm 72 bears on the lower surface of master piston 60 when the engine brake is on so that master piston 60 is driven to reciprocate by the arcuate reciprocation of the adjusting screw. The area of contact between adjusting screw 70 and master piston 66 is one of the highest stress regions in the engine brake. The top of the adjusting screw may be convex to avoid an edge of the screw contacting the master piston when the adjusting screw rocks due to oscillation of rocker arm 72. This convexity reduces the area of contact between the adjusting screw and the master piston, thereby contributing to the high stress in the contact area. The arcuate motion of adjusting screw 70 also causes the top of the screw to slide back and forth on the master piston surface it contacts, thereby increasing the tendency of the contacting surfaces to wear. To reduce this wear it has been necessary to ensure good lubrication between the master piston and the engine component such as adjusting screw 70 which contacts it. It has also been known to weld a layer of tungsten carbide material to the wear surface of the master piston. For example, such a tungsten carbide layer may be 0.014 to 0.015 inches thick.

Engine performance is constantly being pushed to higher levels. Increased engine performance leads to even higher stress on the master piston in an associated engine brake. This may cause the above-mentioned tungsten carbide layer to crack. Unfortunately, tungsten carbide can only be deposited on the master piston in a relatively thin layer as mentioned above. Engine manufacturers are also now interested in so-called "dry engines." These are engines employing much less lubricant than has been traditionally employed. Reduced lubricant reduces the horsepower required for lubricant pumping, and also reduces the amount of combusted lubricant (and therefore pollutants) in the engine exhaust. From the standpoint of engine brake manufacture, however, a dry engine is an even more severe operating condition because there is less lubricant available for lubricating the engine brake master piston surfaces which receive the driving inputs from the associated engine.

Substitution of a ceramic such as silicon nitride ($Si_3N_4$) for the tungsten carbide on master pistons has been considered. This would be advantageous because silicon nitride has a modulus of elasticity close to that of the bearing steel (e.g., so-called 52100 bearing steel) typically used for parts such as the adjusting screw 70 which contact the master piston in FIG. 1 of the '625 patent. However, silicon nitride has a coefficient of thermal expansion which is much less than (e.g., only about one-sixth) the coefficient of thermal expansion of the steel used to make master pistons. This makes secure attachment of a ceramic element to a master piston difficult, especially in view of the fact that the ceramic element would typically be on the lower surface of the associated master piston, where it would be out of contact with any part of the engine when the engine brake is off.

In view of the foregoing, it is an object of this invention to facilitate the provision of mechanical components with securely attached ceramic bearing surface elements.

It is a more particular object of this invention to provide engine brake pistons (especially master pistons) with securely attached ceramic inserts for use as bearing surfaces.

SUMMARY OF THE INVENTION

These and other objects of the invention are accomplished in accordance with the principles of the invention by providing a mechanical component such as an engine brake piston with a recess for receiving a ceramic insert. The side wall of the recess has a channel which extends longitudinally in a direction transverse to the axis along which the ceramic insert is inserted in the recess. The side wall of the insert also has a channel which extends longitudinally in a direction transverse to the axis along which the insert is inserted. When the insert is inserted in the piston, the channels in the piston and the insert are substantially aligned with one another and open toward and therefore communicate with one another. A retainer member projects part way into each channel and thereby prevents the retainer member from coming out of the recess, even though the insert may fit relatively loosely in the recess under some or even all anticipated thermal conditions. The retainer member may cooperate with the channels to resiliently urge the insert inwardly with respect to the recess in order to keep the insert fully seated in the recess.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
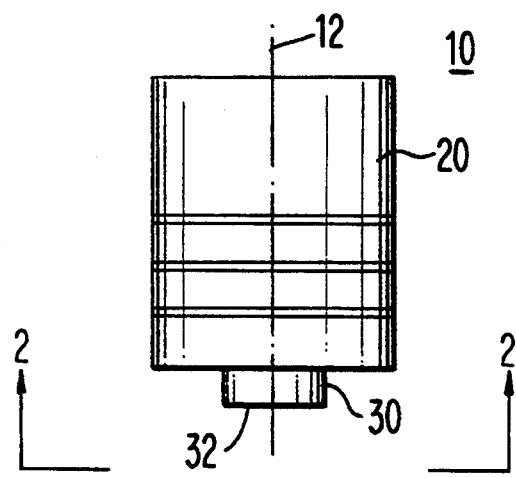
FIG. 1 is a simplified elevational view of an illustrative embodiment of an engine brake piston constructed in accordance with the principles of this invention.
Figure 2:
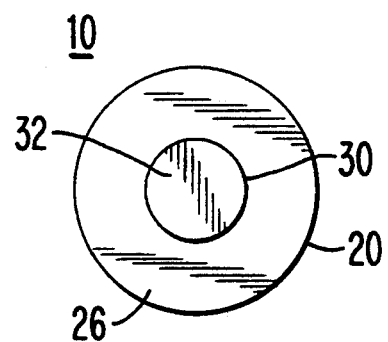
FIG. 2 is a view taken along the line 2—2 in FIG. 1.

As shown in FIGS. 1 and 2, an illustrative engine brake master piston 10 constructed in accordance with this invention includes a substantially cylindrical main body 20 of steel, with a smaller substantially cylindrical insert 30 of ceramic such as sintered silicon nitride protruding slightly from the center of the lower surface 26 of main body 20. As shown, for example, in the above-mentioned Meistrick et al. patent, main body 20 is intended to be received in a master cylinder in an engine brake and is reciprocated in that cylinder parallel to longitudinal axis 12 whenever the engine brake is turned on. In such use, motion in the upward direction is imparted to piston 10 by a part of the associated engine pushing up on the lower surface 32 of insert 30. When that engine part moves down again, the hydraulic circuit operated by master piston 10 pushes piston 10 back down by hydraulic pressure acting on the upper surface of main body 20.

Figure 3:
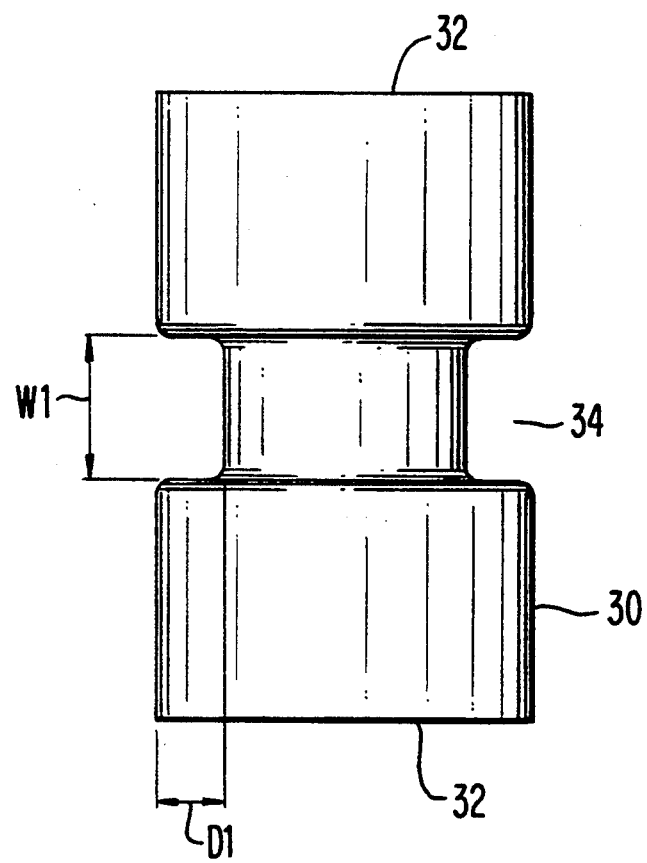
FIG. 3 is an enlarged elevational view of one component of the engine brake piston of FIG. 1.

Ceramic insert 30 is shown by itself on a larger scale in FIG. 3. Except for an annular channel 34 at the midpoint of its length, insert 30 is cylindrical. As will become more apparent below, channel 34 is preferably midway between the ends 32 of insert 30 so that it does not matter which end of insert 30 is inserted into main body 20 during assembly of the apparatus. The considerations influencing the dimensions of channel 34 (e.g., its depth D1 and width W1) are discussed below.

Figure 4:
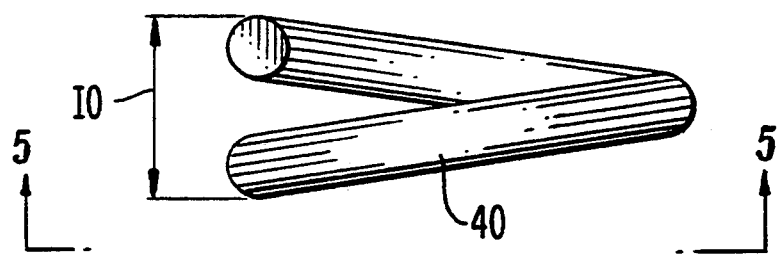
FIG. 4 is an enlarged elevational view of another component of the engine brake piston of FIG. 1 prior to assembly of that component in the engine brake piston.
Figure 5:
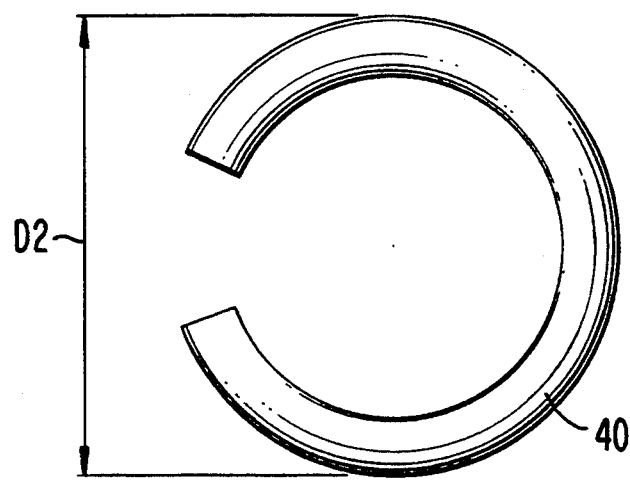
FIG. 5 is a view taken along the line 5—5 in FIG. 4.
Figure 6:
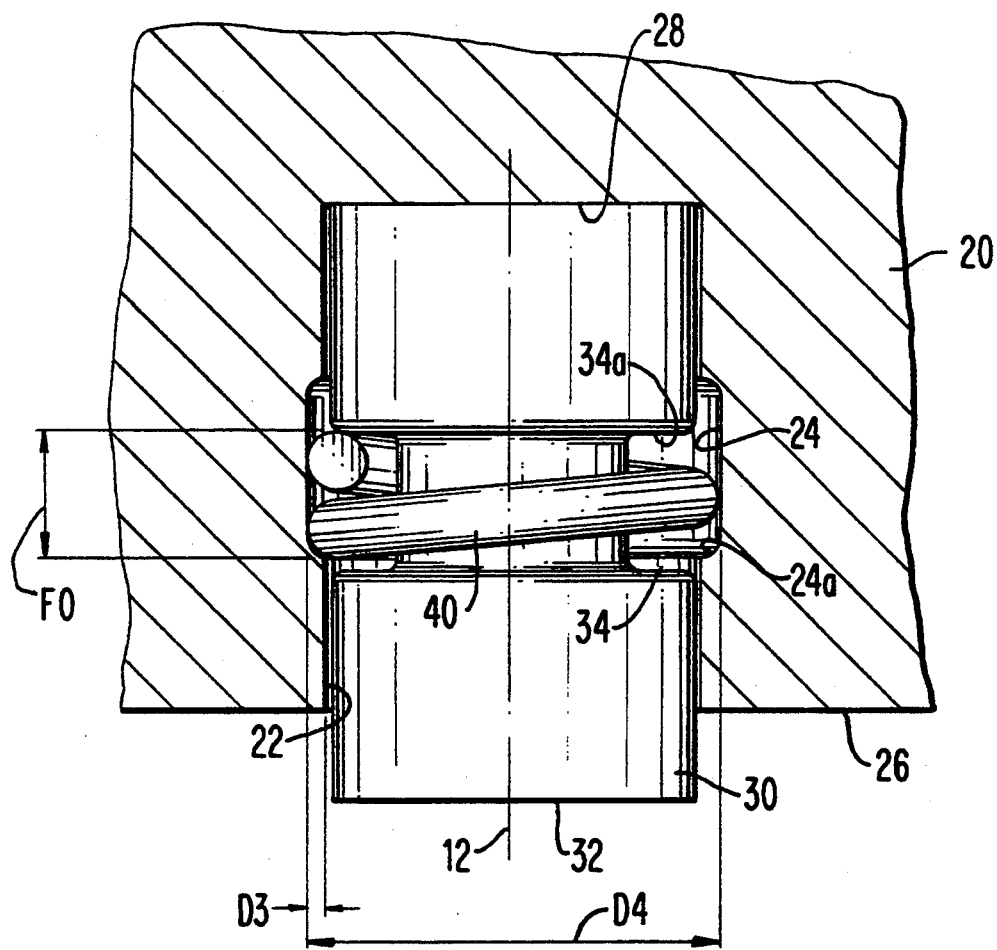
FIG. 6 is an enlarged, partial, sectional view of the engine brake piston of FIG. 1.

As shown in FIG. 6, insert 30 is held in main body 20 by a nearly annular retainer ring 40. FIGS. 4 and 5 show retainer ring 40 by itself prior to assembly with the other components. Although retainer ring 40 is preferably less than a complete annulus, it is nearly annular and is therefore referred to for convenience herein as a ring. Retainer ring 40 is preferably made of spring steel wire (e.g., so-called music wire) and is formed as a segment of a helix. The ends of retainer ring 40 are initially offset from one another parallel to the longitudinal axis of this helix by an amount IO which is greater than the space (FO) allowed for such an offset in the assembled master piston. Also, the initial diameter D2 of retainer ring 40 is preferably slightly larger than the space (D4) allowed for the retainer ring diameter in the assembled master piston.

As can be seen in FIG. 6, main body 20 has a substantially cylindrical recess 22 in the center of its lower surface for partly receiving insert 30 parallel to longitudinal axis 12. Recess 22 is deep enough, parallel to axis 12, to receive most but not all of the length of insert 30. In particular, one axial end 32 of insert 30 seats against the upper end of recess 22 when the other axial end of insert 30 has the desired amount of projection from the bottom surface of main body 20.

An annular channel 24 is formed in the substantially cylindrical side wall of recess 22. When insert 30 is seated in recess 22, channel 24 is adjacent to and communicates with the channel 34 in insert 30.

Master piston 10 is assembled by first placing retainer ring 40 around insert 30 adjacent to channel 34. Then one end of insert 30 is pushed into recess 22. At least by the time retainer ring 40 reaches the bottom surface 26 of main body 20, the retainer ring is annularly compressed so that it is substantially entirely received within channel 34. The depth D1 of channel 34 is therefore typically at least equal to the diameter of the wire used to make retainer ring 40. The entrance to recess 22 may be faired to facilitate annular compression of retainer ring 40. With retainer ring 40 annularly compressed into recess 34, insert 30 can be pushed farther into recess 22 until the upper end of the insert seats against the upper end 28 of the recess. When channel 34 becomes adjacent to channel 24, retainer ring 40 springs out until it bears against the radially outermost surface of channel 24. The depth D3 of channel 24 is chosen to be less than the diameter of the wire used to make retainer ring 40 so that the wire spans channels 24 and 34 (i.e., so that part of the thickness of the wire is in channel 24, while the remainder of the thickness of the wire is in channel 34). Retainer element 40 thus cooperates with channels 24 and 34 to prevent insert 30 from falling out of recess 22 once the insert has been seated in the recess.

In addition to keeping insert 30 in recess 22 as described above, retainer 40 also resiliently bears on the sides of channels 24 and 34 to help keep the upper end of the insert pressed against the upper end 28 of recess 22. In particular, when insert 30 is seated in recess 22, the distance FO between the upper side 34a of channel 34 and the lower side 24a of channel 24 is less than the initial offset IO between the ends of retainer ring 40. Accordingly, the ends of retainer ring 40 are somewhat compressed between these channel sides. Retainer ring 40 therefore applies continuous upward spring force on insert 30 to keep it fully and firmly seated in recess 22.

It will be understood that the foregoing is merely illustrative of the principles of this invention, and that various modifications can be made by those skilled in the art without departing from the scope and spirit of the invention. For example, the invention is equally applicable to the provision of ceramic inserts on other types of mechanical components such as cam followers for internal combustion engines. The configurations of the various elements employed can also be modified if desired. For example, channels 24 and 34 do not have to be completely annular. They could occupy only portions of annuli. Insert 30 could have a cross-sectional shape other than circular. For example, it could have any of many other cross-sectional shapes such as oval, rectangular, square, etc. The retainer element comparable to retainer ring 30 also need not be a substantially circular annulus. Other shapes are perfectly possible. The retainer element need not be made of round wire, but could instead be made of material with other cross-sectional shapes such as a rectangle or square.

The invention claimed is:

1. A mechanical assembly comprising:
   a main body having a recess;
   a ceramic insert inserted into recess; and
   means for holding said insert in said recess, wherein said main body is a piston for use in a hydraulic circuit in an engine brake, and wherein said insert is adapted for contacting a moving part in an internal combustion engine associated with said engine brake for transmitting motion between said moving part and said main body.

2. The apparatus defined in claim 1 wherein said piston is a master piston in said engine brake, and wherein said insert transmits motion of said moving part to said main body.

3. The apparatus defined in claim 1 wherein said insert is made of silicon nitride.

4. The apparatus defined in claim 1 wherein said means for holding resiliently urges said insert into said recess.

5. The apparatus defined in claim 1 wherein said motion is substantially along a longitudinal axis, and wherein said insert is inserted into said recess substantially along said longitudinal axis.

6. The apparatus defined in claim 5 wherein said motion is in a predetermined direction along said longitudinal axis, and wherein said insert is inserted into said recess in said predetermined direction along said longitudinal axis.

7. The apparatus defined in claim 6 wherein said means for holding resiliently urges said insert into said recess in said predetermined direction along said longitudinal axis.

8. The apparatus defined in claim 6 wherein said recess has an end surface transverse to said longitudinal axis and facing opposite to said predetermined direction along said longitudinal axis, and wherein said insert has an end surface which bears on said end surface of said recess when said insert is inserted into said recess.

9. The apparatus defined in claim 8 wherein said means for holding resiliently urges said end surface of said insert into contact with said end surface of said recess.

10. The apparatus defined in claim 8 wherein said insert is symmetrical about a plane transverse to said longitudinal axis so that said insert can be inserted into said recess with either of two rotational orientations about an axis in said plane.

11. The apparatus defined in claim 5 wherein a side wall of said recess has a first channel which extends transverse to said longitudinal axis, wherein a side wall of said insert has a second channel which extends transverse to said longitudinal axis and which is adjacent to and communicates with said first channel when said insert is inserted in said recess, and wherein said means for holding comprises a retainer member disposed in said first and second channels and projecting part way into each of said channels for cooperating with said channels to hold said insert in said recess.

12. The apparatus defined in claim 11 wherein said retainer member is resilient and is prestressed in said first and second channels so that said retainer member resiliently urges said insert into said recess.

13. The apparatus defined in claim 12 wherein said retainer member is made of music wire.

14. The apparatus defined in claim 11 wherein said retainer member is an elongated member which extends transverse to said longitudinal axis, and wherein side by side first and second lateral parts of said elongated member project respectively into said first and second channels.

15. The apparatus defined in claim 14 wherein each of said first and second channels is substantially annular around said insert.

16. The apparatus defined in claim 15 wherein said retainer member is a substantially annular ring substantially concentric with said first and second channels.

17. The apparatus defined in claim 16 wherein said substantially annular ring is split so that said ring has two ends which are spaced from one another across the split in said ring.

18. The apparatus defined in claim 17 wherein said ring is prestressed radially outwardly against the bottom of said first channel.

19. The apparatus defined in claim 18 wherein said second channel is deep enough to accommodate substantially the entirety of said ring during insertion of said insert and said ring into said recess.

20. The apparatus defined in claim 17 wherein a first portion of said ring bears on a first side of said first channel, wherein a second portion of said ring bears on a second side of said second channel, and wherein said ring is prestressed so that it resiliently urges said first and second sides apart, said first and second sides being oriented so that said resilient urging has the effect of urging said insert to move inwardly of said recess.

21. The apparatus defined in claim 20 wherein said first portion of said ring is adjacent one end of said ring, wherein said second portion of said ring is adjacent the other end of said ring, and wherein said ends of said ring are offset from one another parallel to said longitudinal axis to produce the prestress which resiliently urges said first and second sides apart.

22. A mechanical assembly comprising:
a main body having a recess;
a ceramic insert inserted into said recess along a predetermined axis; and
a unitary member extending between said main body and said ceramic insert transverse to said predetermined axis for holding said insert in said recess, said recess having an annular side wall substantially parallel to and extending around said predetermined axis, said side wall of said recess having a first annular channel which also extends around said predetermined axis, wherein said ceramic insert has an annular side wall substantially parallel to and extending around said predetermined axis, said side wall of said ceramic insert having a second annular channel which also extends around said predetermined axis, said first and second channels at least partly overlapping one another, and wherein said unitary member is partly disposed in each of said first and second channels.

23. The apparatus defined in claim 22 wherein said unitary member is substantially annular and extends at least part way around said predetermined axis.

24. The apparatus defined in claim 23 wherein said unitary member is prestressed parallel to said predetermined axis and bears on side surfaces of said first and second channels to resiliently urge said ceramic insert to move into said recess parallel to said predetermined axis.

* * * * *